US008170862B2

(12) United States Patent
Konno

(10) Patent No.: US 8,170,862 B2
(45) Date of Patent: May 1, 2012

(54) DOCUMENT IMAGE PROCESSING DEVICE AND DOCUMENT IMAGE PROCESSING PROGRAM FOR MAINTAINING LAYOUT IN TRANSLATED DOCUMENTS

(75) Inventor: Yuya Konno, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 571 days.

(21) Appl. No.: 12/370,259

(22) Filed: Feb. 12, 2009

(65) Prior Publication Data

US 2009/0210215 A1    Aug. 20, 2009

(30) Foreign Application Priority Data

Feb. 14, 2008   (JP) ................................. 2008-032614

(51) Int. Cl.
*G06F 17/28* (2006.01)
*G06F 17/21* (2006.01)
*G09G 5/26* (2006.01)

(52) U.S. Cl. ................. 704/3; 704/2; 345/472; 715/269

(58) Field of Classification Search ........................ None
See application file for complete search history.

(56) References Cited

U.S. PATENT DOCUMENTS

| | | | | |
|---|---|---|---|---|
| 6,012,073 A | * | 1/2000 | Arend et al. ................... | 715/236 |
| 6,119,077 A | * | 9/2000 | Shinozaki ........................... | 704/3 |
| 7,729,540 B2 | * | 6/2010 | Koyama et al. ................ | 382/181 |
| 7,783,472 B2 | * | 8/2010 | Nagao et al. ....................... | 704/2 |
| 7,844,893 B2 | * | 11/2010 | Saito et al. ..................... | 715/231 |
| 7,865,353 B2 | * | 1/2011 | Koyama et al. ................... | 704/3 |
| 8,050,906 B1 | * | 11/2011 | Zimmerman et al. ............. | 704/2 |
| 2006/0217954 A1 | | 9/2006 | Koyama et al. | |
| 2006/0245005 A1 | * | 11/2006 | Hall et al. ...................... | 358/448 |
| 2008/0172219 A1 | * | 7/2008 | Thomas ............................ | 704/8 |

FOREIGN PATENT DOCUMENTS

| | | |
|---|---|---|
| JP | 5-324720 A | 12/1993 |
| JP | 7-28829 A | 1/1995 |
| JP | 8-6948 A | 1/1996 |
| JP | 3213197 B2 | 7/2001 |
| JP | 2003-44461 A | 2/2003 |
| JP | 3636490 B2 | 1/2005 |
| JP | 2006-268150 A | 10/2006 |

OTHER PUBLICATIONS

Notification of Reasons for Refusal issued in counterpart Japanese Application No. 2008-032614 dated Nov. 26, 2009.

* cited by examiner

*Primary Examiner* — Matthew Sked
(74) *Attorney, Agent, or Firm* — Sughrue Mion, PLLC

(57) ABSTRACT

A document image processing device includes a region dividing unit that divides a document image into sentence regions, a character recognizing unit that recognizes characters in each sentence region obtained by the region dividing unit, a classifying unit that classifies the sentence regions into groups based on first character sizes and first line spacings, a translation unit that translates the characters constituting a character string in each sentence region, a calculating unit that calculates second character sizes and second line spacings, and a correcting unit that corrects the second character sizes and the second line spacings of the sentence regions classified into a same group by the classified unit so that differences in second character size and second line spacing between the sentence regions of the same group is substantially equal to or less than predetermined values.

10 Claims, 4 Drawing Sheets

DOCUMENT IMAGE PROCESSING DEVICE AND DOCUMENT IMAGE PROCESSING PROGRAM FOR MAINTAINING LAYOUT IN TRANSLATED DOCUMENTS

CROSS-REFERENCE TO RELATED APPLICATION

This application is based on and claims priority under 35 USC 119 form Japanese Patent Application No. 2008-032614 filed Feb. 14, 2008.

BACKGROUND

Technical Field

The present invention relates to a document image processing device and a document image processing program.

SUMMARY

According to an aspect of invention, a document image processing device includes a region dividing unit that divides a document image into sentence regions, a character recognizing unit that recognizes characters in each sentence region obtained by the region dividing unit, a classifying unit that classifies the sentence regions into groups based on first character sizes and first line spacings in the sentence regions, wherein the first character sizes represent sizes of the recognized characters and the first line spacings represent spacings between lines, a translation unit that translates the characters constituting a character string in each sentence region to another a language, a calculating unit that calculates, for each sentence region, second character sizes and second line spacings that are used when a character string obtained by translating by the translation unit is arranged in each sentence region, and a correcting unit that corrects the second character sizes and the second line spacings of the sentence regions classified into a same group by the classified unit so that differences in second character size and second line spacing between the sentence regions of the same group is substantially equal to or less than predetermined values.

According to the aspect of the invention, when the new document containing the translated sentence of an original document is generated, with respect to the sentence region which has been set in the same group on the basis of the character size and the line spacing of the original document, the character size and the line spacing are made to be substantially common. Therefore, it is possible to generate the new document without collapsing the balance kept in the original document.

BRIEF DESCRIPTION OF THE DRAWINGS

Exemplary embodiments of the invention will be described in detail based on the following figures, wherein.

DETAILED DESCRIPTION

Figure 1:
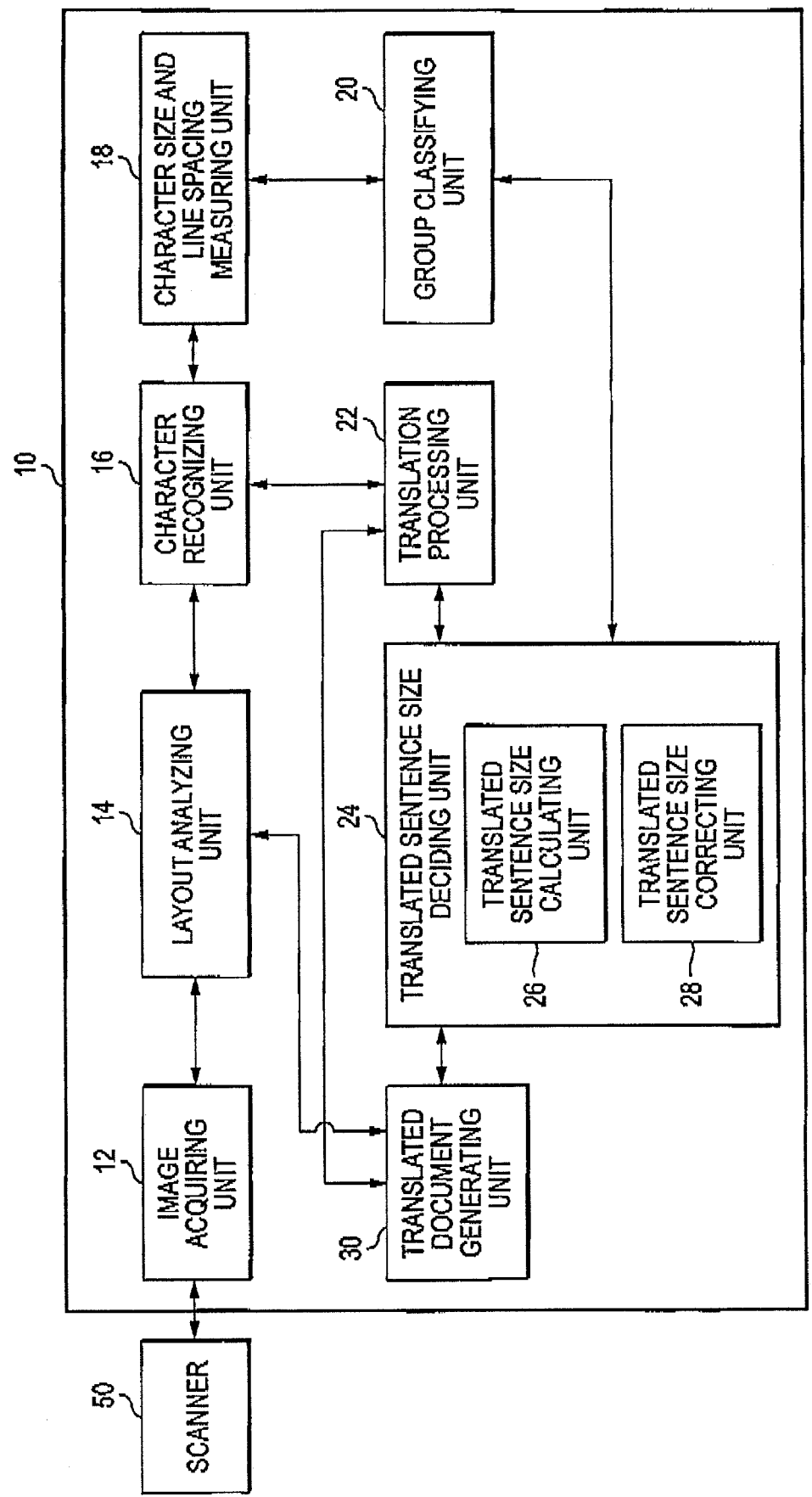
FIG. 1 is a functional block diagram of the document image processing device of the present embodiment.

Referring to the drawings, a preferable embodiment of the present invention, which will be referred to as an embodiment hereinafter, is explained below.

FIG. 1 is a functional block diagram of the document image processing device 10 of the present embodiment. As shown in FIG. 1, the document image processing device 10 includes: an image acquiring unit 12; a layout analyzing unit 14; a character recognizing unit 16; a character size and line spacing measuring unit 18; a group classifying unit 20; a translation processing unit 22; a translated sentence size deciding unit 24; a translated sentence size calculating unit 26; a translated sentence size correcting unit 28; and a translated document generating unit 30. A function of each unit is realized in such a manner that a document image processing program accommodated in an information storing medium capable of being read by a computer is read into and carried out by the document image processing device 10 by using a medium reading device not shown. In this connection, in this case, the document image processing program is supplied to the document image processing device 10 by the information storing medium. However, the document image processing program may be acquired by means of down-load by the document image processing device 10 from a remote place through a data communication network like the Internet.

As shown in FIG. 1, the document image processing device 10 is connected to the scanner 50 through an interface such as USB. The scanner 50 has a CCD camera and scans a document image with the CCD camera and acquires a scanned image. Then, the scanner 50 transfers the acquired scanned image to the document image processing device 10.

The image acquiring unit 12 receives and acquires the scanning data of a document image from the scanner 50 connected to it.

The layout analyzing unit 14 analyzes a layout of the document image acquired by the image acquiring unit 12. The layout is analyzed when the document image is divided into a title region, a text region, a header/footer region, a figure region and a table region. The layout is analyzed by a well known method. From the layout analyzed by the layout analyzing unit 14, a region containing a text, which will be referred to as a sentence region hereinafter, is extracted as an object to be processed. The sentence region is extracted when a region not containing characters is excluded, for example, the sentence region is extracted when a region formed out of only a figure is excluded.

The character recognizing unit 16 recognizes characters contained in the sentence region by OCR processing. OCR processing is executed in such a manner that the sentence region is divided into regions for each character and pattern matching is executed for each divided region and according to the result of the pattern matching, a character contained in each region is decided.

The character size and line spacing measuring unit 18 measures a size of the character, which is contained in each sentence region referred to as a character size hereinafter, and a line spacing. The character size and the line spacing are measured in such a manner that distributions of the character size and the line spacing, which were recognized by the character recognizing unit 16 with respect to the sentence region, are found and central values based on the thus found distributions are determined to be the character size and the line spacing of the sentence region concerned. In this case, for example, the central values may be the respective average values or the modes obtained from the sentence region. The character size and line spacing measuring unit 18 measures character sizes and line spacings with respect to all sentence regions. The central values of the thus measured character sizes and line spacings are stored in the memory in relation to each sentence region.

The group classifying unit 20 classifies the sentence region into groups according to the central values of the character sizes and the line spacings measured for each sentence region. The groups may be classified in such a manner that the sentence regions, the character sizes and the line spacings of which are similar to each other, are classified into the same group. For example, the sentence regions, the character sizes and the line spacings of which agree with each other, are classified into the same group. Alternatively, the sentence regions, the differences of the character sizes and the line spacings of which are in a predetermined range, are classified into the same group. In the present embodiment, the sentence regions, the character sizes and the line spacings of which agree with each other, are classified into the same group. The group classifying unit 20 stores size ratios of the character size and the interval size of each group in the memory.

The translation processing unit 22 analyzes the construction of sentences of the character strings contained in each sentence region and then translates the sentences into a predetermined language, for example, English or Chinese. In this case, the character string is the text data obtained from the result of recognition made by the character recognizing unit 16. In the translation processing, a well known method may be used.

The translated sentence size deciding unit 24 decides a character size and a line spacing of the translated character string arranged in each sentence region after the completion of the translation processing. The translated sentence size deciding unit 24 includes a translated sentence size calculating unit 26 and a translated sentence size correcting unit 28 described later.

According to the sentence region size, the temporary line spacing and character interval and the translated sentence information (the number of characters) obtained by the translation of the text contained in the sentence region, the translated sentence size calculating unit 26 calculates values satisfying the above conditions while the line spacing, the degeneracy ratio and the character size are being reduced in order so that the overall sentences can be accommodated when the translated sentences are embedded in the sentence region corresponding to the translated sentence. At this time, the minimum value of each item may be previously set and the restricting condition may be set so that the value of each item can not become lower than the minimum value that has been set before. The translated sentence size calculating unit 26 executes the character size calculating processing for each sentence region.

The translated sentence size correcting unit 28 corrects a character size and a line spacing of each translated sentence so that the character size of each sentence region in the translated sentence can maintain a relative relation of the character size and line spacing of each sentence region in the original sentence. In the translated sentence size correcting unit 28, the first and the second correction are made as explained below.

The first correction is made so that the character size and line spacing of each sentence region calculated by the translated sentence size calculating unit 26 can be the same size for each classified group. The first correction may be made in such a manner that the sentence region contained in the same group is made to agree with the minimum character size, line spacing and degeneracy ratio in the group. In this way, with respect to each group, while the character size and line spacing in the group are being unified, the sentences are accommodated in the sentence region.

The second correction is made so that the character size and the line spacing of each sentence region of the document containing the newly generated translated sentence can be corrected correspondingly to the ratios of the character size and the line spacing of each sentence region in the original sentence, on the basis of the respective ratios of the character size and the line spacing between the preserved groups. In the second correction, it is judged whether or not the ratios of the character size and the line spacing between the groups agree with the ratios in the original document. In the case where it is judged that the ratios of the character size and the line spacing between the groups do not agree with the ratios in the original document, the character size and the line spacing of the group are further corrected. In the second correction, the character size and the line spacing may be respectively corrected. Alternatively, only one of the character size and the line spacing may be corrected.

Specifically, the correction is made as follows. When the character sizes of the original group are 5, 10 and 20 points, the ratio 1:2:4 of the character sizes is stored in the memory. The character size after the translation of the intermediate group is corrected so that a distance of the character size from the front and rear groups can be (2-1):(4-2), that is, a distance of the character size from the front and rear groups can be 1:2. The line spacing can be also processed in the same manner.

The translated document generating unit 30 generates the translated document data according to the layout analyzed by the layout analyzing unit 14, the translated sentence in each sentence region decided above, the character size in each sentence region, the line spacing and the degeneracy ratio. For example, the translated document data may be of the data type such as a data type made by a word processor or a data type of PDL.

Figure 2:
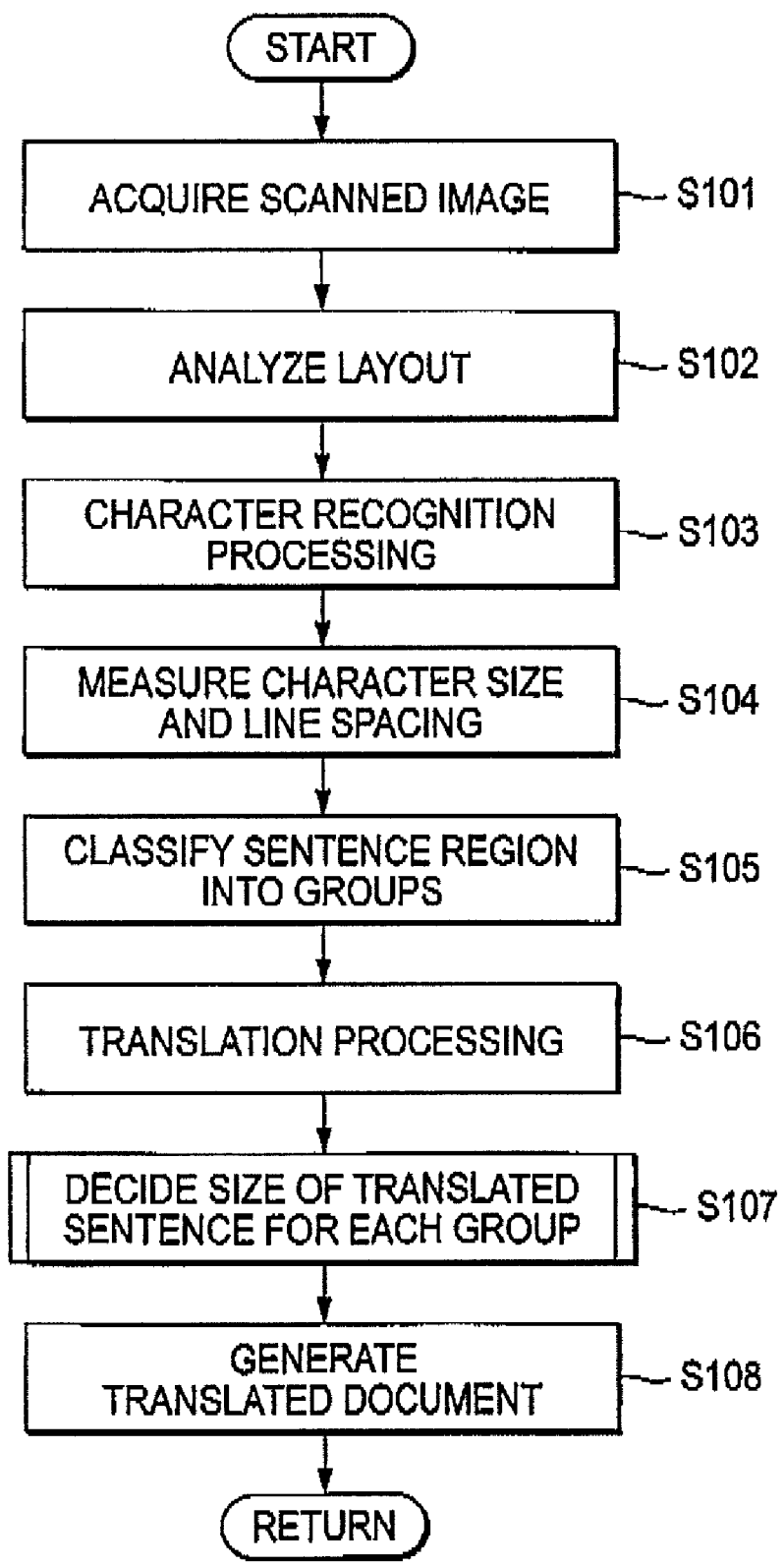
FIG. 2 is a flow chart of the processing of generating a translated document.

Next, referring to FIGS. 2 to 4, explanations will be made into a specific flow of the processing in which a translated document is generated from an original document (a scanned image) by the document image processing device 10. FIG. 2 is a flow chart of the processing of generating a translated document.

The document image processing device 10 transmits a command of scanning to the scanner 50. When the scanner 50 receives the scanning command from the document image processing device 10, the scanner 50 scans a document image, which has been set, with CCD camera and generates a scanned image. The scanner 50 transmits the generated scanned image to the document image processing device 10. The document image processing device 10 receives and acquires the scanned image which has been transmitted before (S101).

The document image processing device 10 analyzes a layout of the scanned image, which has been received from the scanner 50 (S102), and specifies a sentence region contained in the layout of the scanned image. As a specific example, an example of the layout of the scanned image is shown in FIG. 3. As shown in FIG. 3, the scanned image 200 contains a sentence region 200*a-f*.

The document image processing device 10 executes the character recognition processing for recognizing characters contained in the respective sentence regions with respect to each sentence region (200*a-f*) contained in the analyzed layout (S103).

Next, the document image processing device 10 measures a character size and a line spacing for each sentence region (S104). The character size may be measured in such a manner that, for example, an average value and a mode of the character size and the line spacing recognized from the sentence region are calculated for each sentence region. The character size (S) and the line spacing (L) obtained from the result of the measurement are shown in each sentence region of FIG. 3(A).

After the processing of measuring the character size and the line spacing has been completed for all sentence regions, the document image processing device 10 classifies the sentence regions into groups on the basis of the combination of the character size and the line spacing measured for each sentence region (S105). In the present embodiment, the sentence regions, the character sizes of which are the same, are classified into the same group. In the example shown in FIG. 3(A), the document image processing device 10 classifies the sentence regions contained in the document image into three groups of G1: (200*a, d, e*), G2 (200*b*), G3 (200*c, f*). At the same time, the document image processing device 10 stores the character size and the line spacing of each group and also stores the ratio of the value between the groups in the memory. Concerning the ratio, a value based on one group (for example, G1) selected from the classified group may be used.

After the completion of the above processing in which the sentence regions are classified into groups, the document image processing device 10 executes the processing of translation in which the text data formed out of characters recognized with respect to each sentence region is translated into a predetermined language, for example, English or Chinese (S106).

After the completion of the above translation processing, the document image processing device 10 decides a character size and a line spacing of the translated sentence arranged in each sentence region so that the translated sentence, which will be referred to as a translation sentence hereinafter, can be accommodated in the respective sentence region and the relative character size and line spacing in each document region in the original sentence can be maintained (S107). In this case, the processing of deciding the character size and line spacing of the translation sentence arranged in each) sentence region will be explained below referring to the flow chart shown in FIG. 4.

Figure 3A:
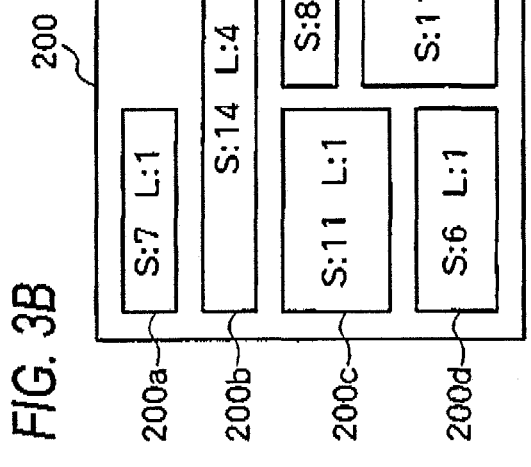
FIG. 3 is a view showing an example of the layout of a scanned image.
Figure 3B:
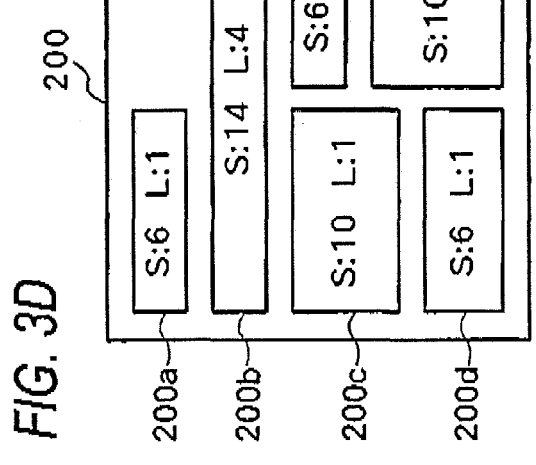
Figure 4:
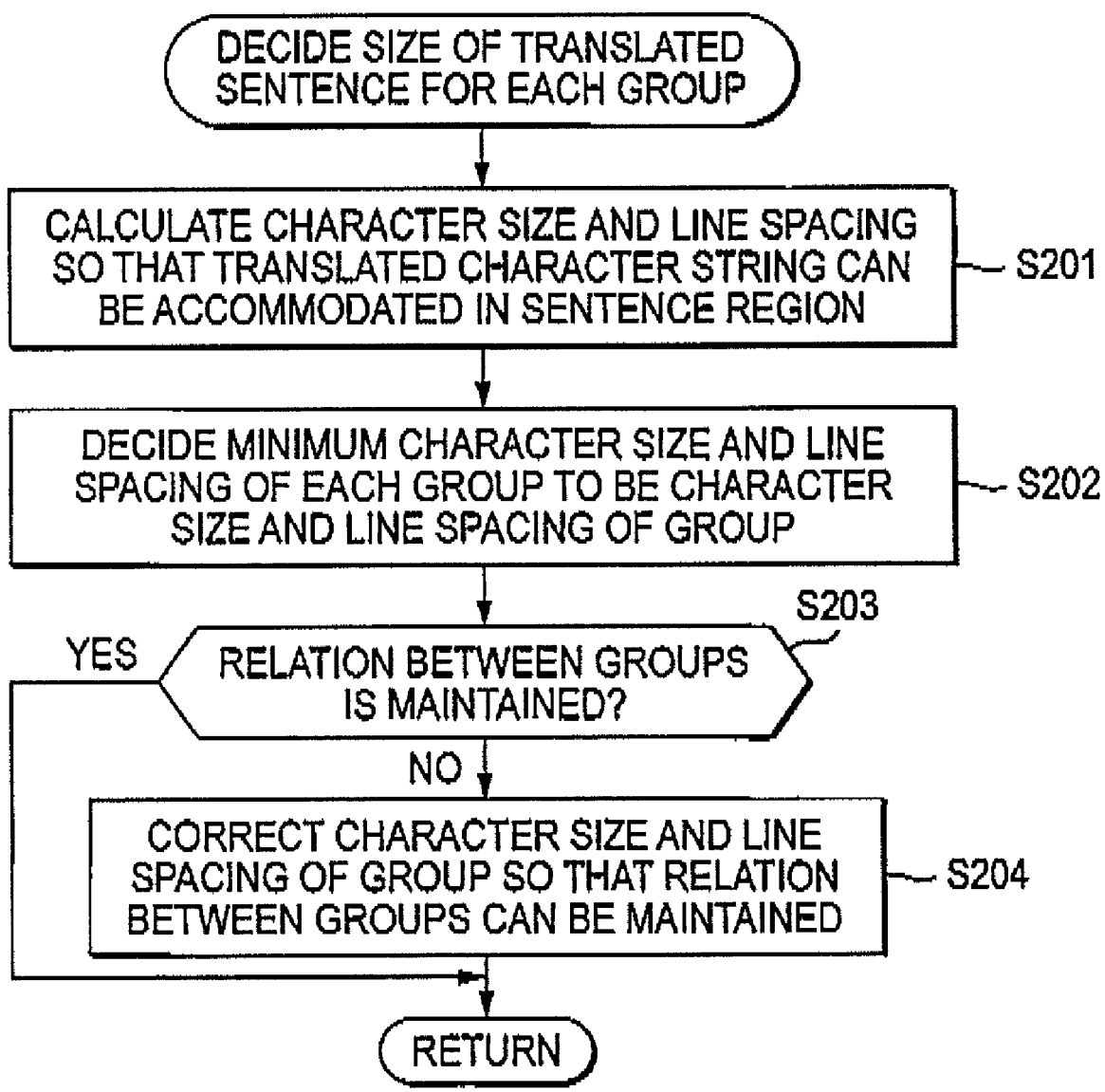
FIG. 4 is a flow chart of the processing of deciding a translated sentence size in a document region.

As shown in FIG. 4, the document image processing device 10 calculates a character size and a line spacing accommodated in the sentence region on the basis of the size of the sentence region for each document region and on the basis of the information of the translation character string (the number of characters of the translation character string) (S201). In FIG. 3(B), the above calculated character size (S) and the line spacing (L) are shown in each sentence region.

Figure 3C:
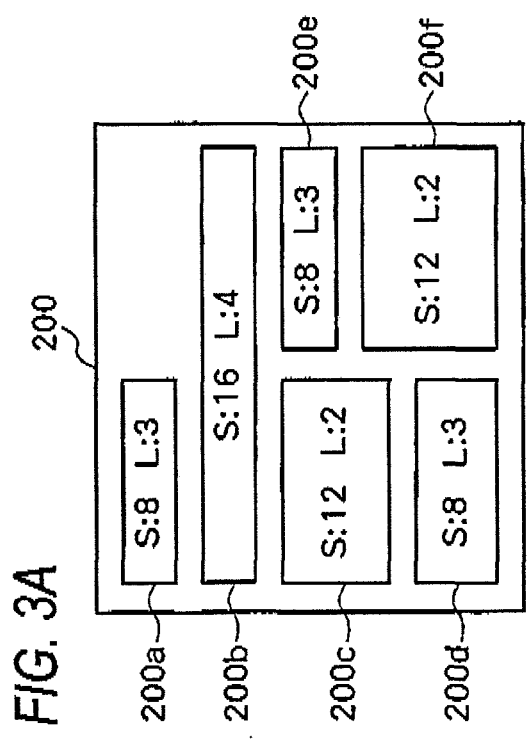
Figure 3D:
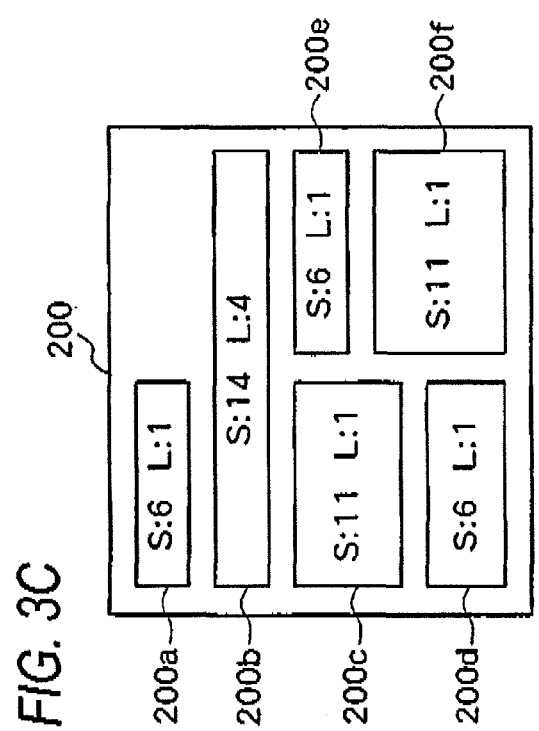

After the completion of the processing of operation of the character size, for each group, the document image processing device 10 decides the minimum values of the character size and the line spacing of the sentence region belonging to the group to be the character size and the line spacing of the group concerned (S202). All the character sizes and the line spacings of the sentence region belonging to the group are temporarily changed to the character size and the line spacing of the group decided above. The processing described above is the first correction. In FIG. 3(C), the character size (S) and the line spacing (L), which are changed by the first correction, are shown in each sentence region.

After the character size and the line spacing have been decided with respect to all groups, the document image processing device 10 judges whether or not the ratio of the character size and the line spacings between the groups on the original document image are maintained (S203). In the case where it is judged that the ratios between the groups are not maintained (S203: N), the document image processing device 10 calculates the character size and the line spacing of each group so that the ratios between the groups can be maintained and the thus calculated values are made to be a new character size and line spacing (S204). The above processing is the second correction of the character size. In this connection, in the second correction, one of the character size and the line spacing may be corrected.

After the above processing of deciding the character size has been completed, the program proceeds to S108, and the document image processing device 10 generates a translation document on the basis of the character size and the line spacing decided with respect to each sentence region decided above (S108). In this way, the processing is finished.

According to the document image processing device 10 of the present embodiment explained above, when OCR is carried out for the document image obtained by scanning a paper document and the document is translated and embedded in the original layout, a sentence region, in which the character size and the line spacing are the same as those of the original document, can be maintained in the translated document in the same manner. Due to the foregoing, the overall composition of the document can be maintained in a well balanced state and the document can be finished in a unified feeling.

The present invention is not limited to the above specific embodiment. For example, in the translated sentence size correcting unit 28, it is further judged whether or not an interval of the character size between the groups is smaller than a predetermined interval. In the case where it is judged that an interval of the character size between the groups is smaller than a predetermined interval, the character size of the group may be corrected. In this case, the correction of the character size may be executed by arranging the character sizes between the groups at regular intervals.

In the translated sentence size deciding unit 24, in the case where it is judged that a character size distribution after the translation of the sentence region classified into the same group deviates and an element exists in which the character size is greatly different, the element in which the character size is greatly different may be excluded from the group.

In the case where the character size of the group is adjusted in the translated sentence size deciding unit 24, by changing an aspect ratio of the character, the character size may be adjusted on the basis of the character size larger than the minimum character size.

When the character interval and the line spacing after the translation of the sentence region are adjusted, a length of the sentence in the region, in which the character size is kept at a small character size, may be adjusted.

A form of a new document containing the translated sentence is not limited to the above embodiment but the original sentence and the translated sentence may be arranged at an upper and lower position.

It is possible to apply the present invention to a document written in a language except for Japanese in the same manner. Of course, it is possible to apply the present invention to a document image of a type except for a scanned image obtained when a document printed on a sheet of paper is scanned.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A document image processing device comprising:
a region dividing unit that divides a document image into sentence regions;
a character recognizing unit that recognizes characters in each sentence region obtained by the region dividing unit;
a classifying unit that classifies first character sizes and first line spacings in the sentence regions as a same group (i) when the first character sizes are the same as each other or the first character sizes are in a first predetermined range and (ii) when the first line spacings are the same as each other or the first line spacings are in a second predetermined range, wherein the first character sizes represent sizes of the recognized characters and the first line spacings represent spacings between lines;
a translation unit that translates the characters constituting a character string in each sentence region to another language;
a calculating unit that calculates, for each sentence region, second character sizes and second line spacings that are used when a character string obtained by translating by the translation unit is arranged in each sentence region; and
a correcting unit that corrects the second character sizes and the second line spacings of the sentence regions classified into the same group by the classifying unit so that differences in second character size and second line spacing between the sentence regions of the same group are substantially equal to or less than predetermined values.

2. The document image processing device according to claim 1, wherein the correcting unit corrects the second character sizes and the second line spacings in the sentence regions, which are classified into the same group by the classifying unit, to be a minimum character size and a minimum line spacing in the sentence regions classified into the same group.

3. The document image processing device according to claim 1, wherein the correcting unit corrects the second character sizes of the groups so that a magnitude relation among the second character sizes of the groups corresponds to a magnitude relation among the first character sizes of the groups.

4. The document image processing device according to claim 3, wherein the correcting unit
corrects the second character sizes of the groups based on a ratio of the first character sizes of the groups.

5. The document image processing device according to claim 1, wherein the correcting unit corrects the second line spacings of the groups so that a magnitude relation among the second line spacings of the groups corresponds to a magnitude relation among the first line spacings of the groups.

6. The document image processing device according to claim 5, wherein the correcting unit corrects the second line spacings of the group based on a ratio of the first line spacings of the groups.

7. The document image processing device according to claim 1, wherein the calculating unit calculates the second character sizes and the second line spacings in each sentence region so as not to fall below predetermined minimum values.

8. The document image processing device according to claim 1, wherein the correcting unit corrects the second character sizes so as to maintain a ratio of the second character sizes among groups classified as the same group by the classifying unit, and
the correcting unit corrects the second line spacings so as to maintain a ratio of the second line spacings among groups classified as the same group by the classifying unit.

9. A non-transitory computer readable medium storing a program causing a computer to execute document image processing, the document image processing comprising:
dividing a document image into sentence regions;
recognizing characters in each sentence region;
classifying first character sizes and first line spacings in the sentence regions as a same group (i) when the first character sizes are the same as each other or the first character sizes are in a first predetermined range and (ii) when the first line spacings are the same as each other or the first line spacings are in a second predetermined range, wherein the first character sizes represent sizes of the recognized characters and the first line spacings represent spacings between lines;
translating the characters constituting a character string in each sentence region to another language;
calculating, for each sentence region, second character sizes and second line spacings that are used when a character string obtained by the translating is arranged in each sentence region; and
correcting the second character sizes and the second line spacings of the sentence regions classified into the same group so that differences in the second character sizes and the second line spacings between the sentence regions of the same group are substantially equal to or less than predetermined values.

10. A method for processing a document image of a document image processing device, the method comprising:
dividing the document image into sentence regions;
recognizing characters in each sentence region;
classifying first character sizes and first line spacings in the sentence regions as a same group (i) when the first character sizes are the same as each other or the first character sizes are in a first predetermined range and (ii) when the first line spacings are the same as each other or the first line spacings are in a second predetermined range, wherein the first character sizes represent sizes of the recognized characters and the first line spacings represent spacings between lines;
translating, using a processor, the characters constituting a character string in each sentence region to another language;
calculating, for each sentence region, second character sizes and second line spacings that are used when a character string obtained by the translating is arranged in each sentence region; and
correcting the second character sizes and the second line spacings of the sentence regions classified into the same group so that differences in the second character sizes and the second line spacings between the sentence regions of the same group are substantially equal to or less than predetermined values.

* * * * *